US010877164B2

(12) United States Patent
Archibald et al.

(10) Patent No.: US 10,877,164 B2
(45) Date of Patent: Dec. 29, 2020

(54) RADIOACTIVITY DETECTION IN A TARGET FLUID IN A FLUID COMMUNICATION PASSAGEWAY WITH A REGION OF SCINTILLATOR MATERIAL AND A SOLID-STATE LIGHT-SENSOR ELEMENT

(71) Applicant: The University of Hull, Hull (GB)

(72) Inventors: Stephen James Archibald, Hull (GB); David Jenkins, Heslington (GB); Nuray Yavuzkanat, Heslington (GB); Mohammad Mehdi Nasr Esfahani, Hull (GB); Mark Tarn, Hull (GB); Nicole Pamme, Hull (GB)

(73) Assignee: The University of Hull, Hull Humberside (GB)

( * ) Notice: Subject to any disclaimer, the term of this patent is extended or adjusted under 35 U.S.C. 154(b) by 28 days.

(21) Appl. No.: 16/084,143

(22) PCT Filed: Mar. 3, 2017

(86) PCT No.: PCT/GB2017/050576
§ 371 (c)(1),
(2) Date: Sep. 11, 2018

(87) PCT Pub. No.: WO2017/153722
PCT Pub. Date: Sep. 14, 2017

(65) Prior Publication Data
US 2019/0265369 A1    Aug. 29, 2019

(30) Foreign Application Priority Data
Mar. 11, 2016   (GB) .................................. 1604246.7

(51) Int. Cl.
*G01T 1/00* (2006.01)
*G01T 1/20* (2006.01)

(52) U.S. Cl.
CPC ................ *G01T 1/003* (2013.01); *G01T 1/20* (2013.01); *G01T 1/2002* (2013.01); *G01T 1/2006* (2013.01); *G01T 1/2018* (2013.01)

(58) Field of Classification Search
CPC ......... G01T 1/003; G01T 1/20; G01T 1/2002; G01T 1/2006; G01T 1/2018
(Continued)

(56) References Cited

U.S. PATENT DOCUMENTS 3,688,115 A * 8/1972 Antkiw .................... G01V 5/12
250/269.3
3,849,655 A * 11/1974 Martucci ............... G01M 3/228
376/194
(Continued)

FOREIGN PATENT DOCUMENTS

EP    1306691 A2    5/2003
EP    2866056 B1    10/2014
(Continued)

OTHER PUBLICATIONS

International Search Report and the Written Opinion issued in PCT/GB2017/050576, dated May 29, 2015, 17 pages.
(Continued)

*Primary Examiner* — Allen C. Ho
(74) *Attorney, Agent, or Firm* — Sheridan Ross P.C.

(57) ABSTRACT

The present invention relates to a method and apparatus for detecting radioactivity. In particular, but not exclusively, the present invention relates to the detection of radioactivity in a target fluid in a fluid communication passageway using a region of scintillator material (130) to provide light responsive to the presence of radioactive material and at least one silicon photomultiplier (SiPM) (150) for providing an output signal responsive to the light provided by the scintillator material.

9 Claims, 7 Drawing Sheets

(58) Field of Classification Search
USPC .......... 250/356.1, 356.2, 357.1, 362, 363.01, 250/363.02, 363.03, 363.04, 370.09; 378/98.8, 189

See application file for complete search history.

(56) References Cited

U.S. PATENT DOCUMENTS

| | | | | |
|---|---|---|---|---|
| 4,107,525 | A * | 8/1978 | Hart, Jr. | G01F 1/7042 250/303 |
| 4,197,456 | A * | 4/1980 | Fleischer | E21B 47/1015 250/303 |
| 4,251,744 | A * | 2/1981 | Green | G01T 1/003 327/100 |
| 4,271,139 | A * | 6/1981 | Hart | G01N 33/54313 436/523 |
| 4,369,368 | A * | 1/1983 | Bernard | G21C 17/035 250/357.1 |
| 4,694,176 | A * | 9/1987 | Horrocks | G01T 1/2045 250/328 |
| 5,025,161 | A * | 6/1991 | Dodson | G01T 1/204 250/328 |
| 5,120,962 | A * | 6/1992 | Rundt | G01T 1/2045 250/328 |
| 5,171,997 | A * | 12/1992 | Lehtinen | G01T 1/172 250/328 |
| 5,173,607 | A * | 12/1992 | Yrjönen | G01T 1/204 250/328 |
| 5,306,911 | A * | 4/1994 | Hunt | G01F 1/74 250/302 |
| 5,359,198 | A * | 10/1994 | Bourguignon | G01T 1/1642 250/363.02 |
| 5,461,909 | A * | 10/1995 | Arnold | E21B 47/1015 250/255 |
| 5,543,617 | A * | 8/1996 | Roscoe | G01F 1/708 250/259 |
| 5,726,452 | A * | 3/1998 | Marteau | G01T 7/02 250/364 |
| 5,866,907 | A * | 2/1999 | Drukier | G01N 33/60 250/328 |
| 6,242,741 | B1 * | 6/2001 | Miller | G01T 1/161 250/363.02 |
| 6,492,642 | B1 * | 12/2002 | Belanov | G01T 1/204 250/328 |
| 7,619,222 | B2 * | 11/2009 | Kim | G01T 1/204 250/252.1 |
| 7,626,389 | B2 * | 12/2009 | Fiedler | G01R 33/28 324/307 |
| 7,646,845 | B2 * | 1/2010 | Lecomte | A61B 6/032 378/19 |
| 7,902,510 | B2 * | 3/2011 | Mann | G01T 1/003 250/362 |
| 7,923,692 | B2 * | 4/2011 | Tranter | G01T 1/203 250/363.01 |
| 8,063,377 | B2 * | 11/2011 | Schulz | G01T 1/1644 250/363.04 |
| 8,068,896 | B2 * | 11/2011 | Daghighian | A61B 6/037 600/436 |
| 8,114,257 | B2 * | 2/2012 | Thompson | G21F 5/015 204/228.5 |
| 8,916,829 | B2 * | 12/2014 | Cadieux | G01T 1/24 250/362 |
| 8,969,826 | B2 * | 3/2015 | Radomski | G01T 1/003 250/372 |
| 9,109,591 | B2 * | 8/2015 | Marsh | F04B 43/02 |
| 9,304,122 | B2 * | 4/2016 | Saiyed | B01L 3/502715 |
| 9,383,456 | B2 * | 7/2016 | Clarke | G01N 30/62 |
| 9,448,178 | B2 * | 9/2016 | Graeber | B01L 3/502761 |
| 9,623,191 | B2 * | 4/2017 | Uber, III | A61M 5/31573 |
| 9,757,591 | B2 * | 9/2017 | Agamaite | A61N 5/1075 |
| 9,921,172 | B2 * | 3/2018 | Cahill | G01F 23/288 |
| 10,473,668 | B2 * | 11/2019 | Van Dam | G21G 1/0005 |
| 10,611,993 | B2 * | 4/2020 | Huang | C12M 23/08 |
| 2010/0276599 | A1 | 11/2010 | Mann et al. | |
| 2013/0244257 | A1 | 9/2013 | Graeber et al. | |
| 2014/0374630 | A1 | 12/2014 | Saiyed et al. | |

FOREIGN PATENT DOCUMENTS

| | | |
|---|---|---|
| EP | 2866056 A1 | 4/2015 |
| WO | 95/12825 A1 | 5/1995 |
| WO | 1995012825 A1 | 5/1995 |
| WO | 2007/124085 S2 | 1/2007 |
| WO | 2007093913 A2 | 8/2007 |
| WO | 2007124085 A2 | 11/2007 |
| WO | 2013045697 A1 | 4/2013 |
| WO | 2013114333 A1 | 8/2013 |

OTHER PUBLICATIONS

[Great Britain Search Report]issued in GB Application No. GB1604246., dated Oct. 27, 2016, 4 pages.

International Search Report and Written Opinion issued in PCT/GB2017/050576, dated May 29, 2017, 17 pages.

Cho, J. S. et al. Detection of Beta Particles in a Microfluidic Chip Using a Scintillator and CCD. IEEE Nuclear Science Symposium Conference Record. M06-191. pp. 1977-1981. 2006.

Cho, J. S. et al. Cerenkov Radiation Imaging as a Method for Quantitative Measurements of Beta Particles in a Microfluidic Chip. Physics in Medicine and Biology. vol. 54, pp. 6757-6771. 2009.

Cho, J. S. et al. Optimization of Design Parameters of a Prototype CCD-Based Lens-Coupled Imaging System for the Detection of Beta Particles in Microfluidic Chip. IEEE Nuclear Science Symposium Conference Record. NM2-8. pp. 4615-4619. 2007.

Convert L. et al. High Effeciency Microfluidic Beta Detector for Pharmacokinetic Studies in Small Animals. Nuclear Instruments and Methods in Physics Research A: Accelerators, Spectrometers, Detectors and Associated Equipment, 652(1):735-738. 2011.

Jackson, C. et al. Ultra-low Noise and Exceptional Uniformity of SensL C-Series SiPM Sensors. Optical Components and Materials XII, 9359:12 pp. International Society for Optics and Photonics. Mar. 2015.

Laven, M. et al. Radionuclide Imaging of Miniaturized Chemical Analysis Systems. Analytical Chemistry, 76 (23):7102-7108, 2004.

Maoddi, P., et al. Scintillation Detectors Based on Silicon Microfluidic Channels. Journal of Instrumentation, 9 (C01019):9 pp., 2014.

Mapelli, A., et al. Scintillation Particle Detection Based on Microfluidics. Sensors and Actuators A 162:272-275, 2010.

Moser, S. W., et al. Principles and Practice of Plastic Scintillator Design. Radiation Physics and Chemistry. vol. 41, No. 1/2, pp. 31-36, 1993.

Ohlander, A., et al. Real-time Monitoring of Melting Curves on DNA Microarrays in Plastic Lab-on-Foil System Using Silicon Photomultiplier Detectors. 18th International Conference on Miniaturized Systems for Chemistry and Life Sciences. San Antonio, Texas, USA. pp. 2294-2296. Oct. 26-30, 2014.

Szczypinksi, R., et al. Fluorescence Detection in Microfluidics Systems. Przelglad Elektrotechniczy (Electrical Review). 88(10b):88-91, 2012.

Taggart, M. P., et al. On-chip Detection of Radioactivity via Silicon-based Sensors for the Quality Control Testing of Radiopharmaceuticals. 19th International Conference on Miniaturized Systems for Chemistry and Life Sciences. Gyeongju, Korea. pp. 1849-1851. Oct. 25-29, 2015.

Turkcan, S., et al. Single-cell Analysis of [18F]Fluorodeoxyglucose Uptake by Droplet Radiofluidics. Analytical Chemistry. 87(13):6667-6673, 2015.

Vu, N. T., et al. A (beta)-Camera Integrated with a Microfluidic Chip for Radioassays Based on Real-time Imaging of Glycolysis in Small Cell Populations. Journal of Nuclear Medicine, 52(5):815-821, 2011.

\* cited by examiner

RADIOACTIVITY DETECTION IN A TARGET FLUID IN A FLUID COMMUNICATION PASSAGEWAY WITH A REGION OF SCINTILLATOR MATERIAL AND A SOLID-STATE LIGHT-SENSOR ELEMENT

The present invention relates to a method and apparatus for detecting radioactivity. In particular, but not exclusively, the present invention relates to the detection of radioactivity in a target fluid in a fluid communication passageway using a region of scintillator material to provide light responsive to the presence of radioactive material and at least one silicon photomultiplier (SiPM) for providing an output signal responsive to the light provided by the scintillator material.

It is known that from time to time it is desirable or indeed essential to be able to detect radioactivity at a particular target location. Such radioactivity may be a result of an intentionally introduced radioactive material or may be the result of a non-controlled incident. Depending upon the circumstances it is desirable to be able to detect radioactivity to ensure that either a desired level of radioactivity is present or that an undesired level of radioactivity is not present.

Conventionally, scintillation detector systems have been widely used in nuclear and medical physics for various radiation detection methodologies such as spectroscopy and quality control of medical radioisotopes. Such scintillation detector systems utilise scintillating material.

There are two well known types of scintillation materials. These are inorganic and organic scintillators. Examples of inorganic scintillators are sodium iodide (doped with thallium), cesium iodide, bismuth germanate or the like. Organic scintillators are a combination of aromatic hydrocarbons in benzene ring structures. Plastic scintillator material is a combination of a solid polymer matrix (bases) and fluorescent emitter (fluor) that is commonly used and well known organic scintillator.

Certain scintillator material emits scintillation photons responsive to detection of gamma radiation or charged particles. Conventionally, emission scintillation photons are converted from visible light into an electrical signal proportional to incident radiation energy via a sensor such as a photomultiplier tube (PMT). The output from a PMT can be utilised to indicate if a level of radioactivity is within a desired range such as below a predetermined level or above a predetermined level.

Lab-on-a-chip (LOC) devices are well known. An LOC is a device which integrates one or more functions on a single chip of a small size to achieve automation and high-throughput screening of a wide variety of test subjects. For example many LOC devices can be utilised with minute amounts of fluids often referred to as micro fluids to determine the presence or absence of a target subject in the fluid. Conventionally LOCs provide many acknowledged advantages such as having low fluid volume consumption, compactness and low fabrication costs however their use in some respects has been limited in terms of what can and cannot be detected.

Certain LOC devices have been utilised for medical purposes. In this regard there are countless medical techniques which are known to have uses for carrying out a method of treatment or diagnosis on a human or animal body or for determining a characteristic of interest in a sample. Whilst many medical techniques are well known their steps and uses are limited. Likewise many medical applications themselves require components and parts that must be verified to enable correct functioning.

Positron emission tomography (PET) is an example of a known medical technique and has become a very powerful and widely used medical imaging modality for the diagnosis and monitoring of a variety of diseases and conditions. The technique relies on the (typically) intravenous injection of a radiotracer—a targeting molecule labelled with a short-lived radioisotope—into a patient, and the subsequent scanning of the patient in a PET scanner to image the biodistribution of the tracer. Clearly, the injection of a solution containing the radiotracer into a human patient necessitates that the injectable dose be sterile, at a physiological pH, be free of particulate matter, and not contain any potentially harmful starting materials or by-products that may be present as a result of the synthesis procedure. With this in mind, stringent quality control (QC) tests must be performed on injectable doses in order to ensure their suitability for human injection. The tests required for a specific radiotracer are listed in various pharmacopoeia monographs, which detail the techniques/instrumentation to be used and the limits allowed for the different molecules present in the dose.

The most commonly used PET radiotracer is a glucose derivative labelled with the [$^{18}$F]fluoride radioisotope: 2-[$^{18}$F]fluoro-2-deoxy-D-glucose (alternatively known as fludeoxyglucose, F-FDG, or [$^{18}$F]FDG. [$^{18}$F]FDG was first developed for PET in the mid-1970s by the group of Wolf et al., who prepared the tracer via electrophilic substitution. Nowadays, production typically takes place using the nucleophilic substitution method developed by Hamacher et al, J. Nucl. Med, 1986, 27, 235-238. Since its initial development, [$^{18}$F]FDG has become an important imaging tracer in oncology, neurology, and cardiology, being used to monitor glucose metabolism. Other PET radiotracers include, for example, $^{18}$F-FLT ([$^{18}$F]fluoro thymidine), $^{18}$F-FDDNP (2-(I-{6-[(2-[$^{18}$F]fluoroethyl)(methyl)amino]-naphthyl}ethylidene)malonitrile), $^{18}$F-FHBG (9-[4-[$^{18}$F] fluoro-3-(hydroxymethyl)butyl]guanine or [$^{18}$F]-penciclovir), $^{18}$F-FESP ([$^{18}$F]-fluoroethylspiperone), $^{18}$F-p-MPPF (4-(2-methoxyphenyl)-I-[2-(N-2-pyridinyl)-p-[$^{18}$F] fluorobenzamido]ethylpiperazine), $^{18}$F-FDG ([$^{18}$F]-2-deoxy-2-fluoro-D-glucose), $^{18}$F-FMISO ($^{18}$F-fluoromisonidazole) and $^{18}$F-sodium fluoride or the like.

Other radiotracers include e.g. $^{68}$Ga-NOTA-bis (phosphonate), $^{68}$Ga-DOTATOC and $^{68}$Ga-DOTATATE or the like.

Due to its importance and widespread use, the QC requirements for [$^{18}$F]FDG as well as other radiotracer are well-documented in the various pharmacopoeia guidelines.

In recent years, paradigm shifts in the production of radiopharmaceuticals have started to come to the fore, in particular with regards to the concepts of "dose-on-demand" (DOD) and "decentralised production". Currently, PET Centres having a cyclotron will synthesise batches of [$^{18}$F]FDG and transport single or multi-doses to hospitals for PET imaging. However, this does not enable targeting of specific patients with specific conditions, but is more economical since it is easier to produce large volumes of [$^{18}$F]FDG rather than multiple smaller doses of other radiotracers. Dose-on-demand and decentralised production are intended to reverse this scenario by producing a radiotracer of choice as and when needed for a specific patient or group of patients, i.e. towards personalised treatment or stratified treatment, respectively. There are two main methods by which these scenarios are being addressed.

Firstly, a recent technological advance of the "mini" PET cyclotron can be installed within a hospital to allow on-site generation of [$^{18}$F]fluoride. Mini-cyclotrons are designed to be smaller and far less costly than traditional PET cyclotrons, in addition to being self-shielded, which enables their simple installation within a facility without the need for bespoke infrastructure. This type of cyclotron allows only small volumes of [$^{18}$F]fluoride to be produced for the on-demand synthesis of a single dose of radiotracer. Currently, the BG-75 Biomarker Generator mini-cyclotron is available from Advanced Biomarker Technologies (ABT).

While the use of mini-cyclotron represents one type of radiotracer decentralised production, by locating the entire production process within a hospital site, another scenario is that [$^{18}$F]fluoride would actually continue to be generated by a traditional cyclotron at a PET Centre. However, rather than synthesising a batch of radiotracer at the PET Centre itself, the [$^{18}$F]fluoride would instead be transported directly to the imaging site where the radiotracer production would take place. This would allow more flexibility in terms of the type of radiotracer being produced, even if the imaging site did not have direct access to a cyclotron.

With changes in radiosynthesis technologies comes the need for quality control systems to monitor the radiotracers being produced. The pharmacopoeia tests set the current QC standards but they require the use of a variety of different techniques and instrumentation, including thin-layer chromatography (TLC), high performance liquid chromatography (HPLC), and gas chromatography (GC), among others. There are continuing efforts to lower the limits of detection, shorten the testing times, and reduce the sample volumes required. Recently, efforts have also been made to integrate multiple QC tests into a single technique in order to streamline the QC process, thus reducing the instrumentation required and the radiation exposure experienced by technicians.

Furthermore, streamlining of QC processes of other compounds which are for in vivo use, e.g. pharmaceuticals, is also desired.

It is an aim of the present invention to at least partly mitigate one or more of the above-mentioned problems.

It is an aim of certain embodiments of the present invention to provide apparatus and a method for detecting radioactivity in a test sample such as a target fluid or the like.

It is an aim of certain embodiments of the present invention to provide a method of manufacturing a microfluidic device which can be conveniently utilised to detect radioactivity in a test sample.

It is an aim of certain embodiments of the present invention to provide a method and apparatus for detecting a first type of radiation such as positron radiation in a test sample without a risk of other types of radioactivity, such as gamma radiation, providing false positives.

It is an aim of certain embodiments of the present invention to provide a method and apparatus for a lab-on-chip (LOC) scale device in which needed component parts of a radiation detector can themselves form structural parts of the LOC device itself thus obviating and/or minimising a need for component parts and thus cost.

It is an aim of certain embodiments of the present invention to provide a quality control (QC) system to test microfluidic quantities of a test fluid containing quantities of a compound which is for in vivo use.

According to a first aspect of the present invention there is provided apparatus for detecting radioactivity in a target fluid, comprising:
  at least one fluid communication passageway for a target fluid:
  at least one region of scintillator material for providing light responsive to radioactivity in the target fluid; and
  at least one solid state light sensor element for providing an output signal responsive to said light.

Aptly said fluid communication passageway comprises a microchannel in a surface of a substrate adjacent to said region of scintillator material.

Aptly the apparatus comprises an intermediate layer comprising a layer of substrate material or a coating layer between the microchannel and the region of scintillator material.

Aptly said fluid communication passageway comprises a microchannel in a surface of said region of scintillator material.

Aptly the microchannel is provided by two face-to-face sub-microchannels each provided in opposed surfaces of juxtaposed regions of scintillator material.

Aptly the fluid communication passageway comprises a lumen of at least one tube member at a first surface of said region of scintillator material.

Aptly said region of scintillator material comprises at least one layer of plastic scintillator material.

Aptly the layer of plastic scintillator material has a thickness of between about around 0.05 to 2.05 mm.

Aptly said a thickness is between about around 0.1 and 2.0 mm.

Aptly said solid state light sensor element comprises a silicon photomultiplier (SiPM) element.

Aptly the apparatus further comprises a light guide layer between the region of scintillator material and the solid state light sensor.

Aptly the light guide layer comprises a layer of PMMA or PC or COC or COP or PDMS.

Aptly said fluid communication pathway is a microchannel having a width of about around 100 µm to 200 µm e.g. about 150 µm and a depth about around 10 µm to 100 µm e.g. about 50 µm deep.

Aptly said radioactivity comprises positrons and/or gamma rays.

Aptly said scintillator material comprises a polymer material doped with scintillating material and/or a polymer material that exhibits scintillating properties.

Aptly said SiPM element comprises an array of SiPM sensors.

Aptly the fluid communication passageway has an inlet and an outlet and follows a linear or serpentine pathway.

Aptly the apparatus is a microfluidic device.

Aptly the apparatus is connectable to at least one further microfluidic device.

According to a second aspect of the present invention there is provided a chip.

Aptly the chip comprises at least one pump and/or valve element.

Aptly the chip is a microfluidic chip.

According to a third aspect of the present invention there is provided a method for detecting radioactivity in a target fluid, comprising the steps of:
  providing a target fluid to a fluid communication passageway:
  via at least one region of scintillator material, providing light responsive to radioactivity in the target fluid in the fluid communication passageway; and
  via at least one solid state light sensor element, providing an output signal responsive to said light.

Aptly said step of providing a target fluid comprises urging fluid via a pump along at least one microchannel or lumen of a tube.

Aptly said step of providing light responsive to radioactivity comprises providing light responsive to positron emission from a radionuclide in the fluid.

Aptly the method further comprises providing light via a plastic scintillator.

Aptly the method further comprises detecting one or more photons via the solid state light sensor.

Aptly said solid state light sensor element comprises a silicon photomultiplier (SiPM) element and the method further comprises detecting each photon via a respective one of a plurality of microcells of the SiPM, each microcell being arranged to detect a photon identically and independently.

Aptly the method further comprises analysing the output signal via a signal analyser.

Aptly the method further comprises determining if the target fluid comprises a predetermined density of positron sources responsive to said output signal.

Aptly the target fluid is a solution comprising a radiopharmaceutical.

Aptly the radiopharmaceutical is selected from $^{18}$F-FLT ([$^{18}$F]fluoro thymidine), $^{18}$F-FDDNP (2-(I-{6-[(2-[$^{18}$F]fluoroethyl)(methyl)amino]2-naphthyl}ethylidene)malonitrile), $^{18}$F-FHBG (9-[4-[$^{18}$F]fluoro-3-(hydroxymethyl)butyl]guanine or [$^{18}$F]penciclovir), $^{18}$F-FESP ([$^{18}$F]fluoroethylspiperone), $^{18}$F-p-MPPF (4-(2-methoxyphenyl)-I-[2-(N-2-pyridinyl)-p-[$^{18}$F]fluorobenzamido]ethylpiperazine), $^{18}$F-FDG (2-[$^{18}$F]fluoro-2-deoxy-D-glucose), 18F-FMISO ([$^{18}$F]fluoromisonidazole) and $^{18}$F-sodium fluoride.

According to a fourth aspect of the present invention there is provided a method of manufacturing a diagnostic chip, comprising the steps of:
  providing at least one fluid communication passageway;
  providing at least one region of scintillator material for providing light responsive to radioactivity in a target fluid in the fluid communication passageway; and
  providing at least one silicon photomultiplier (SiPM) element for providing an output signal responsive to said light.

Aptly the method further comprises providing a microchannel in a surface of a substrate.

Aptly the method further comprises providing a microchannel in a surface of a region of scintillator material.

Aptly the method further comprises providing a tube comprising a lumen at a first surface of said region of scintillator material.

According to a fifth aspect of the present invention there is provided apparatus constructed and arranged substantially as hereinbefore as described with reference to the accompanying drawings.

According to a sixth aspect of the present invention there is provided a method substantially as hereinbefore described with reference to the accompanying drawings.

Certain embodiments of the present invention provide an apparatus and a method for detecting radioactivity in a target fluid by which at least one region of scintillator material provides light responsive to radioactivity in a target fluid and at least one solid state light sensor element provides an output signal responsive to the light. Depending upon a construction protocol used the target fluid which is to be tested may or may not be in direct contact with a plastic scintillator material.

Certain embodiments of the present invention provide a microfluidic device which may itself be fabricated out of one or more regions of plastic scintillator which itself comprises a key component of the radioactivity detector. The plastic scintillator material can be shaped easily and can be used to detect gamma radiation and/or positron radiation.

Certain embodiments of the present invention enable scintillator material to be directly or indirectly in contact with a solid state light sensor or sensor array.

Certain embodiments of the present invention enable a target fluid to be communicated into an area where radioactivity can be detected along a microchannel formed in one or more surfaces of a substrate and/or scintillator material region. Alternatively such target fluid can be provided in a fluid communication passageway provided as a separate tube close to the surface of a scintillator material.

Certain embodiments of the present invention will now be described hereinafter, by way of example only, with reference to the accompanying drawings in which.

In the drawings like reference numerals refer to like parts.

Figures 1, 2:
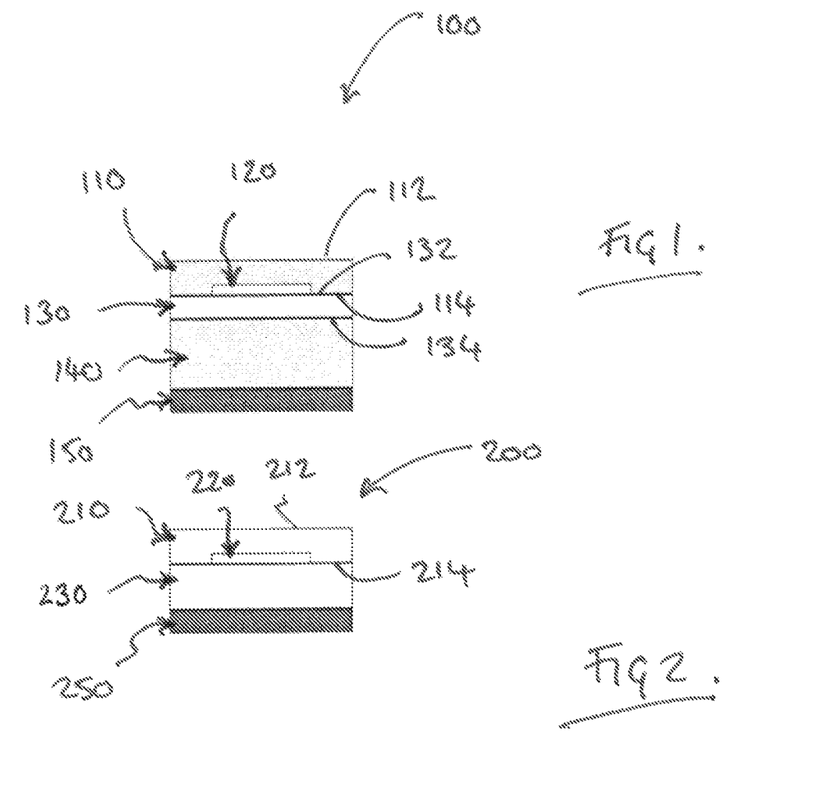
FIG. 1 illustrates a chip with a microchannel, for a target fluid, milled into a substrate surface.
FIG. 2 illustrates a chip with a microchannel, for a target fluid, milled into a substrate surface.

FIG. 1 illustrates a side view of a micro fluidic chip 100. The micro fluidic chip 100 provides apparatus for detecting radioactivity in a target fluid. As illustrated in FIG. 1 the micro fluidic chip 100 comprises an upper substrate 110 which, in the form shown in FIG. 1 is an upper generally planar structure. The upper substrate 110 illustrated is a plastic substrate although it will be appreciated that other conventional materials might alternatively be utilised such as Glass (B270 glass, Borofloat glass, soda lime glass or the like), Polymers (Polycarbonate (PC), Polymethyl methacrylate (PMMA), Cyclic olefin copolymer (COC), Cyclic olefin polymer (COP), Polystyrene (PS), Polydimethyl-siloxane (PDMS) or the like) Silicon or Quartz or the like. The upper substrate 110 has an upper surface 112 and a lower surface 114 which is substantially parallel with and spaced apart from the upper surface 112. A microchannel 120 is a milled channel, milled via CNC milling, in the lower surface 114 of the upper substrate 110. The microchannel 120 provides a fluid communication passageway for a target fluid. In the cross section shown in FIG. 1 the microchannel 120 as a generally rectangular cross-section and extends in a direction into and out of the page. It will be appreciated that the microchannel 120 may have a wide variety of shapes and cross sections as it extends across the micro fluidic chip 100.

It will likewise be appreciated that whilst only one microchannel 120 is illustrated in the upper substrate 110 in FIG. 1 certain embodiments of the present invention can utilise two, three or more microchannels 120 in a spaced apart and/or optionally interconnected relationship in the lower surface 114 of the upper substrate 110.

As an alternative to milling, hot embossing may be utilised or according to certain embodiments of the present invention the upper substrate 110 can be prepared using photolithography and wet etching procedures. Aptly, glass wafers featuring a chromium layer and a photo resist layer are exposed to UV light through a photo mask featuring a channel design. The region of photo resist exposed to light becomes soluble in photo developer solution, which is then used to strip away the exposed region, revealing the channel design on the chromium layer. The exposed chromium is then etched away, leaving the channel design visible on the glass. A solution of 1% hydrofluoric acid can then be used to etch the channel design into the glass, after which access holes can be drilled into the glass if required to provide inlet or outlet regions. It will be appreciated that other concentrations can be utilised according to a speed of etch desired. Remaining photo resistant chromium layers are then removed and the plate thoroughly cleaned.

As noted above the substrate may alternatively be formed from a variety of different types of material. If silicon is used the silicon could be isotropically etched with hydrofluoric acid (as per glass noted above). Alternatively the silicon can also be anisotropically etched via a solution of potassium hydroxide. Reactive ion etching (RIE) or deep reactive ion etching (DRIE) could also be used.

Channels in polymer material may alternatively be milled via CNC milling, injection moulded, laser cut or polymerised in a mould.

Channels in PDMS may alternatively be prepared using rapid prototyping techniques in which a mould is prepared via photolithography (optionally using an SU-8 photoresist or the like), or by CNC milling or by injection moulding. PDMS elastomer and curing agent are then mixed together, degassed and then poured over the mould and allowed to cure before being peeled off the mould.

Metal substrates may optionally be fabricated via CNC milling or electrical discharge machining (EDM).

FIG. 1 also helps illustrate how a layer 130 of scintillator material is juxtaposed against the lower surface 114 of the upper substrate 110. The layer 130 scintillator material illustrated in FIG. 1 is a plastic scintillator. It will be appreciated that other types of scintillator material can be utilised according to certain other embodiments of the present invention. For example aptly polymers doped with scintillator material can be utilised. These consist of a "base" polymer material, for example polystyrene (PS), polyvinyl toluene (PVT), or polymethyl methacrylate (PMMA). Aptly the base material such as the scintillator material can include polyvinyl xylene (PVX), polyvinyl diphenyl or polyvinyl naphthalene. Aptly dopants used are naphthalene or anthracene or inorganic dopants or the like. Aptly according to certain other embodiments of the present invention the scintillator material can be a polymer that exhibits scintillating properties without the addition of a dopant. For example, polyether sulfone (PES), polyvinyl toluene (PVT), polyethylene naphthalate (PEN) or polyethylene terephthalate (PET) or the like. It will be appreciated that combinations of undoped materials can also be utilised according to certain embodiments of the present invention. For example blends of PES and PEN or PET and PEN or the like can be utilised. Aptly the scintillator material is BC-404 or a similar plastic scintillator from the product range of St Gobain Crystals or any similar plastic scintillator. Alternatively EJ-204 or other plastic scintillator from the product range of Eljen Technology may be utilised. The scintillator material is excitable by ionising radiation and creates visible light. As such the layer 130 of scintillator material provides at least one region of scintillator material for providing light responsive to radioactivity in a target fluid which flows along the microchannel 120. The layer 130 of scintillator material has an upper surface 132 adjacent to the lower surface 114 of the upper substrate 110 and a lower surface 134.

As illustrated in FIG. 1 the layer 130 of scintillator material is located on an upper surface of a polymethyl methacrylate (PMMA) layer 140. The layer 130 of scintillator material thus locates above a layer of material that is transparent enough to allow through scintillation light. Other materials other than PMMA could of course be utilised. The PMMA layer 140 is placed between the layer 130 of scintillator material and a silicon photomultiplier (SiPM) layer 150. The optional PMMA layer 140 acts as a shield layer to stop certain types of radiation, such as positrons, according to use from directly interacting with an underlying SiPM layer 150 which includes one or more silicon photomultiplier elements. Without the PMMA layer 140 certain types of radiation might otherwise cause a signal to be generated even when no scintillating material is present. The SiPM layer 150 includes one or more silicon photomultiplier elements for providing an output signal responsive to light generated in the layer 130 of scintillator material responsive to radioactivity in the target fluid in the fluid communication passageway provided by the microchannel 120 milled into the upper substrate 110. Aptly the SiPM layer 150 shown in FIG. 1 comprises an array of multiple silicon photomultiplier elements each providing a respective output signal to an analyser (not shown). The SiPM layer 150 is an example of a layer including at least one solid state light sensor. A solid state light sensor is a light sensor which generates an electrical signal upon exposure of light photons. An example of a solid state light sensor is a Silicon photodiode in which electric current flows across electrodes when light photons fall on the Si wafer. An amount of electrical charge constituting an electrical current generated by any one single photon can be different according to a device "gain". There are various types of solid state light sensor usable according to certain embodiments of the present invention, these include photodiodes, avalanche photodiodes and MPPC or SiPM. It will be appreciated that certain embodiments of the present invention are not limited to use with any particular type of solid state light sensor nor to use of a single sensor or an array of sensors.

An example of a possible SiPM that can be used as part of the solid state light sensor layer is a SensL J series SiPM (see www.sensL.com) where a light sensor area is 1 mm×1 mm. Optionally sensors having a sensor area of 3 mm×3 mm or 6 mm×6 mm may be utilised or sensors may be tiled.

FIG. 2 illustrates an alternative embodiment of a chip 200 to that shown in FIG. 1 in which an upper substrate 210 has an upper surface 212 and lower surface 214 and includes an inset region which provides a microchannel 220. This upper substrate 210 is secured directly onto an upper surface of a layer 230 of scintillator material which itself is disposed over an SiPM layer 250 which, in the example shown in FIG. 2 is an array of silicon photomultiplier elements. Such an embodiment is useful when the target fluid in the microchannel 220 includes a radioactive source which is not a source of positrons which might otherwise cause false positives. Certain embodiments of the present invention can of course be used for positron emitters in which situation it will be appreciated that a certain, small, percentage of a resultant signal is due to positrons directly hitting a detector rather than due to detection of light.

The upper substrate 210 may be secured to the layer 130 of scintillator material and/or PMMA layer 140 via a wide variety of techniques such as use of bonding, double sided tape, hot embossing, ultra sonic welding or the like.

In certain embodiments of the present invention there is provided methods, microfluidic chips and systems for determining at least one characteristic of a sample comprising a compound for in vivo use. According to certain embodiments, a test sample (that is to say a sample to be tested) is formulated for in vivo use prior to testing on the chip and system of embodiments of the present invention. Aptly, the sample is an isotonic saline solution. In an alternative embodiment, the sample is formulated subsequent to testing on the chip and collection from the chip. As used herein, the term "sample" refers to a material to be investigated or analysed on a microfluidic chip. The sample may comprise a single component or a mixture of components. The sample comprises the compound for in vivo use and optionally other substances. Aptly, the sample may for administration to a patient without further formulation following its analysis using certain embodiments of the present invention.

As used herein, the term "compound for in vivo use" refers to any compound which is for administration to a patient in need thereof. The patient may be human or animal. The compound may be a pharmaceutical for prophylactic and/or therapeutic use.

In one embodiment, the compound for in vivo use is a radiopharmaceutical. In one embodiment the compound is a radiotracer. A "radiotracer" is a radiopharmaceutical having a largely unaltered metabolic pathway compared to the unlabelled analogue. It is therefore possible to follow and quantify processes on a particular metabolic pathway by detecting the radioactive decay of the labelling radioisotope.

It will be appreciated that the terms "radiotracer", "radiopharmaceutical", "PET tracer" and "SPECT tracer" as used herein are interchangeable and are exemplary and non-limiting. The mention of one term does not exclude substitution of the other terms in the described embodiment.

Aptly, the radiopharmeutical comprises a radioisotope selected from $^{89}Zr$, $^{64}Cu$ $^{18}F$, $^{99m}Tc$, $^{11}C$, $^{68}Ga$, $^{15}O$ or $^{13}N$.

Radiotracers are used for diagnostic purposes. Examples of radiotracers include, but are not limited to, $^{18}F$-FLT ([$^{18}F$]fluoro thymidine), $^{18}F$-FDDNP (2-(I-{6-[(2-[$^{18}F$]fluoroethyl)(methyl)amino]2-naphthyl}ethylidene)malonitrile), $^{18}F$-FHBG (9-[4-[$^{18}F$]fluoro-3-(hydroxymethyl)butyl]guanine or [$^{18}F$]-penciclovir), $^{18}F$-FESP ([$^{18}F$]-fluoroethylspiperone), $^{18}F$-p-M PPF (4-(2-methoxyphenyl)-I-[2-(N-2-pyridinyl)-p-[$^{18}F$]fluorobenzamido]ethylpiperazine), $^{18}F$-FDG ([$^{18}F$]-2-deoxy-2-fluoro-D-glucose), $^{18}F$-FMISO ($^{18}F$-fluoromisonidazole) and $^{18}F$-sodium fluoride.

$^{18}F$-FDG is a radiolabelled sugar molecule. When used with PET imaging, images are produced that show the metabolic activity of tissues. In FDG-PET scanning, the high consumption of the sugar by tumour cells, as compared to the lower consumption by normal surrounding tissues, identifies these cells as cancer cells. FDG is also used to study tumour response to treatment.

Sodium fluoride is an imaging agent for PET imaging of new bone formation. It can assess changes both in normal bone as well as bone tumours. As a result, it can be used to measure response to treatment.

$^{18}F$-FLT is a radiolabeled imaging agent that is being investigated in PET imaging for its ability to detect growth in a primary tumor. Studies may also measure the ability of FLT with PET to detect tumor response to treatment.

$^{18}F$-FMISO is an imaging agent used with PET imaging that can identify hypoxia (low oxygen) in tissues. Tumours with low oxygen have been shown to be resistant to radiation and chemotherapy.

Alternatively, the radiotracer is a radiopharmaceutical which incorporates a radioisotope selected from the group consisting of $^{11}C$, $^{68}Ga$ and $^{64}Cu$.

In one embodiment, the radiotracer is for example $^{68}Ga$-NOTA-bis (phosphonate), which can be used as a PET radiotracer for bone imaging, $^{68}Ga$-DOTATOC which can be used in PET imaging in patients with meningiomas and/or $^{68}Ga$-DOTATATE which can be used in PET imaging in malignant phaeochromocytomas.

In certain embodiments, the radiotracer is $^{68}Ga$-PSMA (prostate specific membrane antigen). In certain embodiments, the radiotracer can be used in PET imaging of prostate cancer. In certain embodiments, the radiotracer is $^{68}Ga$-pentixafor. In certain embodiments, the radiotracer can be used in PET imaging of small cell lung cancer.

A "radiopharmaceutical composition" comprises a radiotracer e.g. a radiopharmaceutical, or a pharmaceutically acceptable salt thereof, in association with a pharmaceutically acceptable adjuvant, diluent or carrier. In one embodiment, a radiopharmaceutical composition may comprise the radiopharmaceutical and a saline buffer. Aptly, the radiopharmaceutical is a radiotracer as described herein.

The preparation of a radiopharmaceutical may comprise the following steps:

i) separation of a radioisotope from a sample;
ii) activation of the radioisotope, for example by solvent exchange;
iii) synthesis of the radiopharmaceutical, for example a radiotracer;
iv) separation of the radiopharmaceutical, for example a radiotracer, from a reaction mixture;
v) formulation of radiopharmaceutical into a radiopharmaceutical composition, for example a radiotracer formulated with a saline buffer;
vi) analysis of the radiopharmaceutical composition (quality control (QC)).

Certain embodiments of the present invention relate to a microfluidic chip and system comprising such a chip. A fluid flow can be described as "microfluidic" (i.e. "microfluidic fluid flow") if a fluid passes through a channel having at least one dimension of less than 1 mm, in particular a channel having a dimension of less than 1 mm, e.g. less than 500 µm, less than 250 µm, less than 200 µm, or less than 150 µm. This creates laminar flow characteristics (generally having a Reynolds number of less than 100) where diffusion is the dominant cross stream chemical interaction. Consequently, microfluidic fluid flow occurs during the manipulation of small volumes, for example from 1 nl to 100 µl, within microstructured devices that features dimensions of the order of 10's to 100's micrometers.

A "microfluidic flow system" comprises a system having at least one channel for fluid flow, the channel having at least one dimension of less than one 1 mm, for example less than 500 µm, e.g. 300 µm, 200 µm, 150 µm, 100 µm, 50 µm, 20 µm or less. The microfluidic flow system comprises a microfluidic device but may also comprise other components that are in fluid communication with the microfluidic device.

In one embodiment, the system comprises one or more channels having a width of, for example, between about around 100 µm to about 200 µm e.g. about 150 µm and a depth of for example about around 10 µm to 100 µm e.g. about 50 µm deep.

A "microfluidic chip" can be identified by the fact that it has one or more channels with at least one dimension less than 1 mm, for example, less than 500 µm, e.g. 300 µm, 200 µm, 150 µm, 100 µm, 50 µm, 20 µm or less, in particular a channel having a dimension of less than 1 mm, e.g. for example, between about 100 µm to about 200 µm e.g. about 150 µm and a depth of for example about around 10 µm to 100 µm e.g. 50 µm deep. The microfluidic chip may be part of a microfluidic flow system. The one or more channels may form a whole or part of a fluid flow path in the chip.

The microfluidic system of certain embodiments of the invention may be a modular system composed of a plurality of separate components, wherein one or more of the components are in fluid communication in use. The system may alternatively be an integrated system wherein one or more e.g. all of the components are provided on a single platform such as for example a microfluidic device e.g. a device comprising a chip. The device may comprise of be comprised in a microfluidic flow system.

As used herein, the term "microfluidic chip" refers to a device which can be used for synthetic or analytical purposes for samples having a volume of from about 10 nl and 10 ml. In one embodiment, the microfluidic chip is used to process, synthesize and/or analyze samples having a volume of between about 1 µl and 2000 µl e.g. about 1000 µl or less e.g. 500 µl or less. In one embodiment, the microfluidic chip is a microfluidic device and/or comprised within a microfluidic device. In certain embodiments, the microfluidic chip may comprise one or more separable modular components e.g. components comprising an electrochemical cell and the like. Aptly, the modular component may comprise a detection zone as described herein.

The Reynolds number which is used to characterise microfluidic flow (i.e. the flow of a fluid through a microfluidic channel is calculated according to equation 1:

$$Re = \frac{LV_{avg}\rho}{\mu} \qquad \text{equation 1}$$

wherein:
L is the most relevant length scale;
µ is the viscosity;
ρ is the fluid density; and
$V_{avg}$ is the average velocity of the flow.
For many microchannels:

$$L = 4A/P \text{ wherein:} \qquad \text{equation 2}$$

A is the cross sectional area of the channel; and
P is the wetted perimeter of the channel.

Due to the small dimensions of the channels in a microfluidic device, $R_e$ is usually less than 100, in particular less than 1.0. Fluid flow with a Reynolds number of this magnitude is completely laminar with very little or no turbulence such that molecular transport is relatively predictable.

As described herein, certain embodiments of the present invention relate to the analysis of compounds which are for in vivo administration. According to certain embodiments of the present invention the compound is a radiopharmaceutical such as for example [$^{18}$F]FDG, $^{68}$Ga-PMSA, $^{68}$Ga-pentixafor or the like.

In one embodiment, the radiotracer being analysed is for example $^{68}$Ga-NOTA-bis (phosphonate), $^{68}$Ga-DOTATOC, $^{68}$Ga-DOTATATE, $^{68}$Ga-PSMA or $^{68}$Ga-pentixafor.

It will be understood by the person skilled in the art that embodiments of the present invention are not limited to the testing of [$^{18}$F]FDG. For example, certain embodiments of the present invention relate to devices, systems and methods which perform quality control (QC) testing of other radiotracers e.g. $^{68}$Ga-PSMA or $^{68}$Ga-pentixafor and/or other compounds which are for in vivo administration. In certain embodiments of the present invention, the devices, systems and methods are for use to determine at least one characteristic of a pharmaceutical compound. Certain embodiments of the present invention are likewise not limited to the identification of radioactivity in target fluids used for in vivo or indeed medical uses.

In one embodiment, following purification, QC tests are performed on a sample of [$^{18}$F]FDG in order to ensure that a desired level of radioactivity is present and that the properties of the dose are suitable for injection. As used herein, the terms "[$^{18}$F]FDG" and "FDG" are interchangeable and relate to the compound 2-[$^{18}$F]fluoro-2-deoxy-D-glucose. A summary of the process for preparing [$^{18}$F]FDG is as follows:

[$^{18}$F]FDG is usually synthesized by way of nucleophilic substitution (Hamacher et al.) and aptly, the procedure follows the steps of:

1. [$^{18}$F]fluoride generation by proton bombardment of $^{18}$O-enriched cyclotron via a cyclotron;
2. Pre-concentration of aqueous [$^{18}$F]fluoride, e.g. an ion exchange column, or electrode trapping.
3. Release of [$^{18}$F]fluoride in acetonitrile containing addition of phase transfer catalyst (typically Kryptofix 2.2.2) and potassium carbonate.
4. Radiolabelling reaction of mannose triflate with [$^{18}$F] fluoride via $S_N2$ nucleophilic substitution, producing the acetylated form of [$^{18}$F]FDG (i.e. unhydrolysed [$^{18}$F]FDG, also referred to as acetylated-[$^{18}$F]FDG (ACY-[$^{18}$F]FDG) or 2-[$^{18}$F]fluoro-1,3,4,6-tetra-O-acetyl-D-glucose ([$^{18}$F]FTAG)).
5. Solvent exchange from acetonitrile to water.
6. Hydrolysis of acetylated-[$^{18}$F]FDG to [$^{18}$F]FDG, either by acid hydrolysis (HCl) or base hydrolysis (NaOH).
7. Purification of the crude [$^{18}$F]FDG mixture, e.g. via solid-phase extraction (SPE) cartridge(s).
8. Formulation of the [$^{18}$F]FDG dose as an isotonic saline (sodium chloride) solution.

Prior to administration to a patient, the batch of [$^{18}$F]FDG has to undergo a number of quality control (QC) tests to ensure it meets the necessary safety requirements. Aptly, certain embodiments of the present invention provide a microfluidic system which can be used to perform the quality control tests of microfluidic quantities of a compound, e.g. [$^{18}$F]FDG. Certain embodiments of the present invention provide a measurement value which can be used to determine the characteristic of the sample. The measurement value can then be compared to a predetermined corresponding criterion value to determine whether the sample is suitable for administration to a patient. The predetermined corresponding criterion value can be identified using known literature such as for example although not limited to the current British Pharmacopoeia, US Pharmacopeia, European Pharmacopoeia, International Pharmacopoeia, and the like. Examples of quality control tests which a sample may need to be subjected to are described in more detail below. One such test may be detection of the level of radioactivity in the sample.

The chip 100 illustrated in FIG. 1 and the chip 200 illustrated in FIG. 2 can be utilised for determining if a target fluid in the respective microchannel comprises a predetermined density of positron sources or indeed any other selected radiation sources. For example gamma emitters, such as SPECT radiotracers, may alternatively be detected. As such it is possible to detect whether the target fluid flowing in the microchannel is a solution comprising a radiopharmaceutical having sample characteristics which meet a stated requirement for use. It will be appreciated that whilst the embodiments described with respect to FIGS. 1 and 2 have been described as providing chips able to detect radioactivity in a target fluid which can be used for medical purposes, certain other embodiments of the present invention are not so limited. Rather the chips described are generally applicable and usable for detecting radioactivity in any target fluid. Such target fluid is communicated via a fluid communication passageway where scintillating material provides light responsive to the radioactivity in the target fluid and one or more silicon photomultipliers (SiPM) elements provide an output signal responsive to the generated light. For example, the target fluid may be provided from a contaminated work site or may be pre-prepared for use in the chip using a carrier fluid together with certain contaminated or potentially contaminated material which is to be tested.

FIGS. 1 and 2 help illustrate a method of how a diagnostic chip can be manufactured by helping to illustrate how at least one fluid communication passageway can provide, for example by milling a channel or multiple channels in a surface of a substrate, and how at least one region of scintillator material for providing light responsive to radioactivity in a target fluid in the fluid communication passageway can then be provided in direct contact or in indirect contact with the target fluid. As illustrated in FIG. 1 or FIG. 2 the scintillator material layer can be utilised to close one side of the channel to help close and thereby define the passageway along which fluid can travel. As a further step in the method of manufacturing such a diagnostic chip at least one silicon photomultiplier (SiPM) element can be provided in an SiPM layer for providing an output signal responsive to the light. Subsequent to manufacture the chips can be utilised in used alone or as part of a further larger scale lab-on-chip device (see described later).

Figure 3:
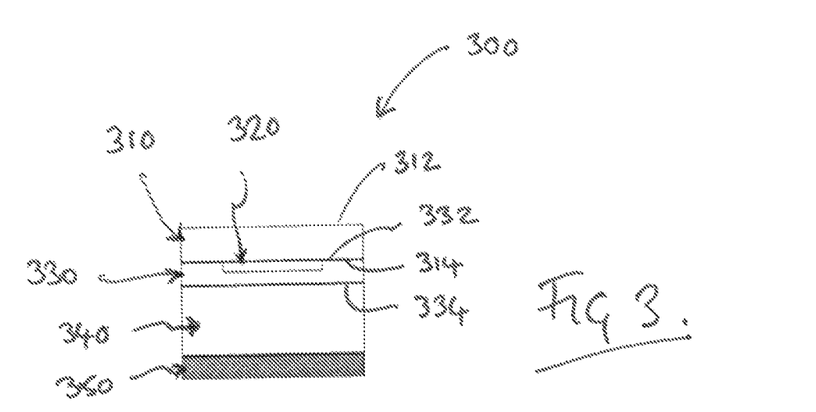
FIG. 3 illustrates a microchannel in a region of scintillator material.
Figure 4:
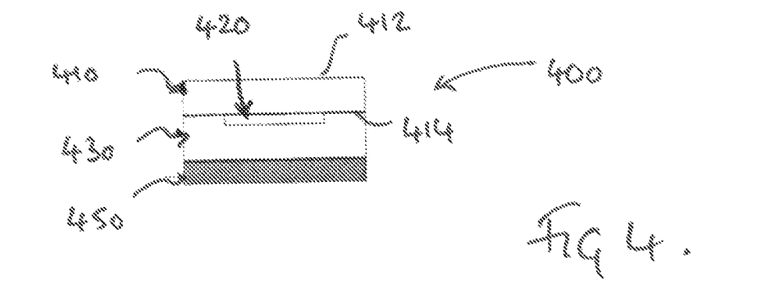
FIG. 4 illustrates a microchannel in a region of scintillator material.

FIGS. 3 and 4 illustrate a respective chip according to certain other embodiments of the present invention sharing many features in common with the chips illustrated in FIGS. 1 and 2. In FIGS. 3 and 4 the respective microchannels are formed as inset regions in the scintillator layer rather than, as per FIGS. 1 and 2, inset regions in a substrate.

In more detail FIG. 3 illustrates a side view of a microfluidic chip. The chip 300 provides apparatus for detecting radioactivity in a target fluid. As illustrated in FIG. 3, the chip comprises an upper chip substrate 310 which, in the form shown in FIG. 3, is an upper generally planar structure. This substrate is formed from a plastic substrate material although a wide variety of materials might be utilised as noted above. The substrate 310 has an upper surface 312 and a lower surface 314 which is substantially parallel with and spaced apart from the upper surface 312. A microchannel 320 is formed in an upper surface of a layer 330 of scintillator material. This layer 330 is juxtaposed against the lower surface 314 of the substrate. The scintillator illustrated in FIG. 3 is a plastic scintillator. It will be appreciated that other types of scintillating material can be utilised according to certain other embodiments of the present invention as previously described. The scintillator layer 330 has an upper surface 332 in which the microchannel is formed adjacent to the lower surface 314 of the substrate and a lower surface 334.

As illustrated in FIG. 3 the scintillator material is located on an upper surface of a PMMA layer 340 or other such transparent layer that can transport the light. This PMMA layer is placed between the scintillator 330 and a silicon photomultiplier layer 350. The SiPM layer includes one or more silicon photomultiplier (SiPM) elements for providing an output signal responsive to light generated in the light scintillator layer responsive to radioactivity in the target fluid in the fluid communication passageway provided by the microchannel 320 in the scintillator layer. The optional PMMA layer 340 acts as a shield layer.

FIG. 4 illustrates an alternative embodiment and illustrates a chip 400 in which a substrate 410 has an upper surface 412 and a lower surface 414. The substrate 410 is secured directly onto an upper surface of the scintillator layer which helps form a microchannel 420. A microchannel inset region is provided in the upper surface of the scintillator layer (430). This may optionally be milled into the surface of the scintillator layer or, as illustrated in FIG. 4, when the scintillator material is a plastic scintillator the scintillator material can be moulded to include the inset region. Other techniques such as hot embossing could be used as previously described. The scintillator layer 430 is itself disposed over an SiPM layer 450 which, in the example shown in FIG. 4 is an array of silicon photomultiplier elements.

Figure 5:
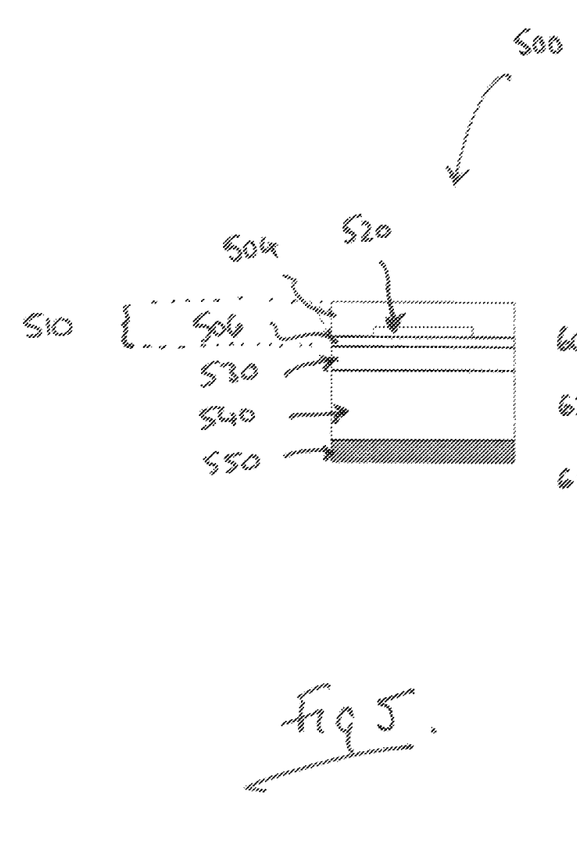
FIG. 5 illustrates a microchannel separated from scintillator via an intermediate layer.
Figure 6:
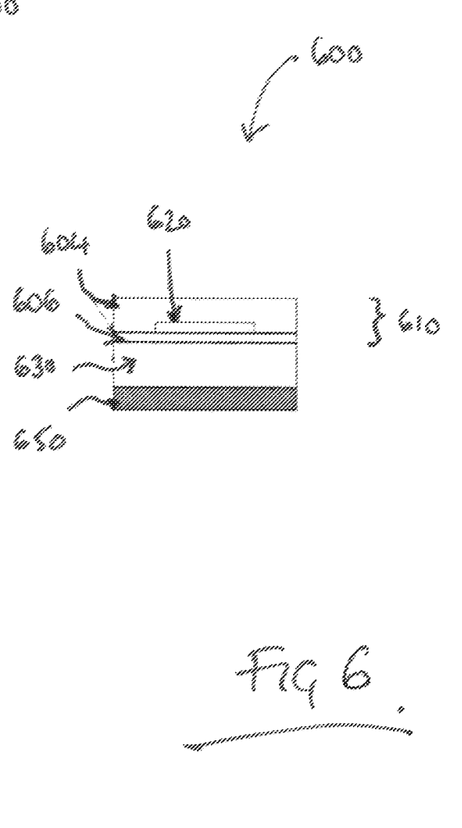
FIG. 6 illustrates a microchannel separated from a scintillator layer via an intermediate layer.

FIGS. 5 and 6 illustrate a respective chip according to certain other embodiments of the present invention. These share many features in common with the chips illustrated in FIGS. 1, 2, 3 and 4. In FIGS. 5 and 6 the respective microchannels are formed in a lower surface of a first layer of two layers forming a chip substrate. The chip substrate is thus formed from two chip substrate sub-layers. The lower chip substrate sub-layer closes an inset region in a lower surface of an upper portion of the chip substrate. The lower chip substrate sub-layer thus acts as a spacer between the microchannel and the plastic scintillator layer.

In more detail FIG. 5 illustrates a side view of a micro fluidic chip 500. The chip 500 provides apparatus for detecting radioactivity in a target fluid. As illustrated in FIG. 5 the chip comprises an upper chip substrate sub-layer 504 and a lower chip substrate sub-layer 506. The two sub-layers 504, 506 together form a chip substrate 510. A microchannel 520 is provided in a lower surface of the upper chip substrate sub-layer 504 as an inset region. The lower chip substrate sub-layer 506 closes the inset region to thereby provide the microchannel. The chip substrate 510 formed by multiple sub-layers is located on an upper surface of a scintillator layer 530 which is located on an upper surface of a PMMA layer 540 which is located over an SiPM layer 550 which includes one or more photomultiplier elements such as, as illustrated in FIG. 5 an array of silicon photomultiplier elements.

FIG. 6 illustrates a side view of a micro fluidic chip 600. The chip 600 provides apparatus for detecting radioactivity in a target fluid. As illustrated in FIG. 6 the chip comprises an upper chip substrate sub-layer 604 and a lower chip substrate sub-layer 606. Together the upper and lower chip substrate sub-layers form a chip substrate 610. The microchannel 620 is provided by an inset region in the upper chip substrate sub-layer 604 and is closed by the lower chip substrate sub-layer 606. The chip substrate 610 is located over a scintillator layer 630 which itself is located over an SiPM layer 650. It will be appreciated that as an alternative the microchannel might be formed by an inset region in an upper surface of a lower sub-layer and closed by a non-inset (or partially inset) upper sub-layer.

The lower sublayers are intermediate layers between the microchannel and the scintillator of the scintillator layer.

The intermediate layer may alternatively be a thin film or coating layer. This can help promote or prevent adhesion between opposed surfaces.

Figure 7:
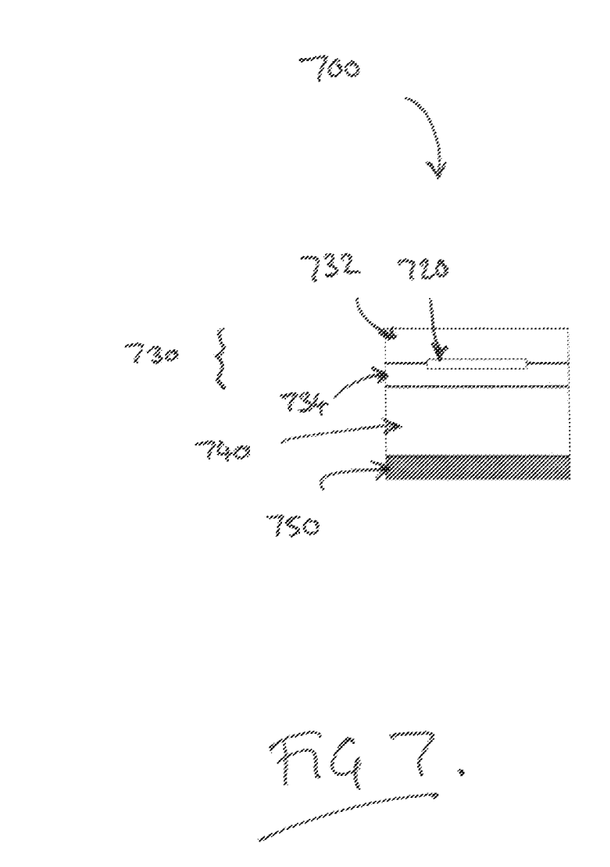
FIG. 7 illustrates a micro fluidic device in which a microchannel is formed by opposed inset areas in a region of a first and a further scintillator layer.
Figure 8:
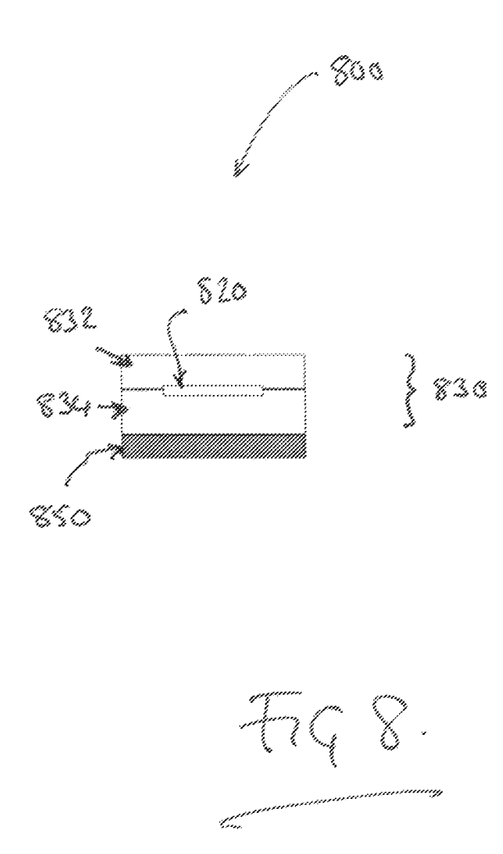
FIG. 8 illustrates a micro fluidic device in which a microchannel is provided by opposed inset areas in a first and a further scintillator layer.

FIGS. 7 and 8 illustrate a respective chip according to certain other embodiments of the present invention. These share many features in common with the previously described chips. In FIGS. 7 and 8 the respective microchannels are each formed by an inset region in both an upper and lower layer.

For example as shown in more detail in FIG. 7 which illustrates a side view of a microfluidic chip 700 the chip can be formed without a chip substrate but rather with a microchannel 720 formed in a scintillator layer 730. The chip 700 provides apparatus for detecting radioactivity in a target fluid. The scintillator layer 730 is provided by an upper scintillator sub-layer 732 and a lower scintillator sub-layer 734. A lower surface of the upper scintillator sub-layer 732 has an inset region and an upper surface region of the lower scintillator sub-layer 734 has an inset region. The scintillator sub-layers shown in FIG. 7 are formed from a plastic scintillator and the inset regions can be moulded into the layers during manufacture. It will be appreciated that other mechanisms for forming the inset regions can be utilised according to certain other embodiments of the present invention. It will likewise be appreciated that whilst two scintillator sub-layers are illustrated in FIG. 7 the upper sub-layer could be a chip substrate layer with a scintillator layer formed by the lower scintillator sub-layer. FIG. 7 helps illustrate how, according to certain embodiments of the present invention, a microchannel can be formed by juxtaposed inset regions in an upper and lower layer rather than having a whole inset region formed in any single layer. The scintillator sub-layers 732, 734 illustrated in FIG. 7 are bonded together by double sided tape. It will be appreciated that other securing mechanisms can be utilised to secure these two layers or indeed any of the layers described in the specification together. For example glue or bonding or ultrasonic welding or the like can be utilised.

The scintillator layer 730 illustrated In FIG. 7 is provided over a PMMA layer 740 which is located over an SiPM layer 750 which includes one or more SiPM elements. In the embodiment illustrated in FIG. 7 the SiPM layer 750 is provided as an array of SiPM detectors.

The chip illustrated in FIG. 8 illustrates a micro fluidic chip 800 which includes a microchannel 820 which is formed by juxtaposed inset regions formed in a scintillator layer 830 provided by an upper scintillator sub-layer 832 and a lower scintillator layer 834. The chip 800 provides apparatus for detecting radioactivity in a target fluid. The scintillator layer 830 which includes a microchannel 820 is located over an SiPM layer 850 which, in the embodiment shown in FIG. 8 is an SiPM array.

Figure 9:
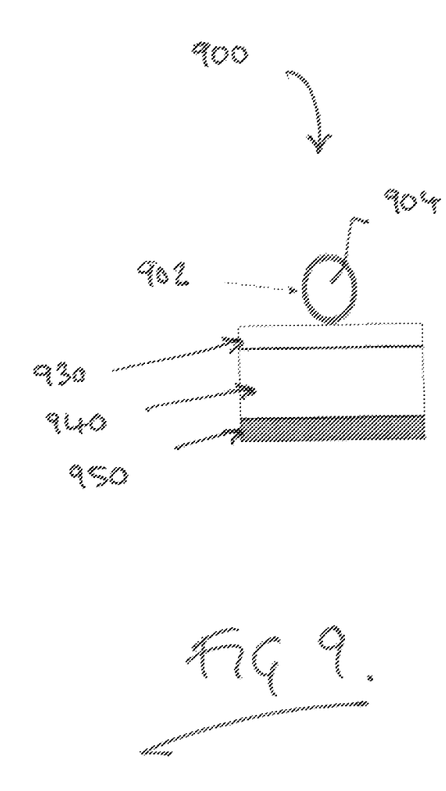
FIG. 9 illustrates tubing providing a fluid communication passageway at a surface of a region of scintillator material.
Figure 10:
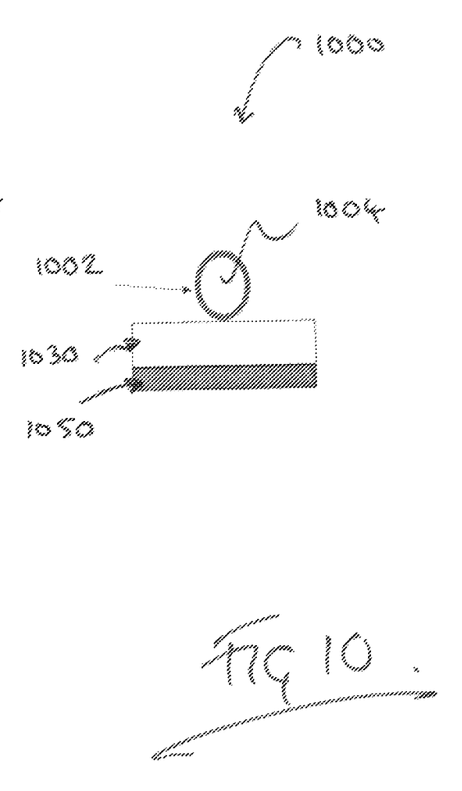
FIG. 10 illustrates tubing providing a fluid communication passageway at a surface of a region of scintillator material.

FIGS. 9 and 10 illustrate a respective chip according to certain other embodiments of the present invention. In FIGS. 9 and 10 a tube is utilised at an upper surface of a scintillator layer. The lumen of the tube provides a microchannel for communicating fluid.

In more detail FIG. 9 illustrates a side view of a micro fluidic chip 900. The chip 900 provides apparatus for detecting radioactivity in a target fluid. As illustrated in FIG. 9 the chip includes a tube 902 which defines an inner bore or lumen 904 along which target fluid can flow. FIG. 9 illustrates a cross section of the tube which is running into and out of the page. It will be appreciated that whilst the embodiment shown in FIG. 9 (and FIG. 10) illustrates a tube having a circular cross section tubes having other shape cross sections can be utilised according to certain other embodiments of the present invention. Multi lumen tubes may likewise by utilised.

The tube 902 is located on an upper surface of a scintillator layer 930 which is located over a PMMA layer 940. The PMMA layer is located over an SiPM layer 950 which includes at least one SiPM element.

FIG. 10 helps illustrate a micro fluidic chip 1000 which includes a tube 1002 which includes a lumen 1004 which provides a fluid communication passageway for a target fluid. The tube is located at an upper surface of a scintillator layer 1030 which is located over an SiPM layer 1050.

It will be appreciated that according to certain other embodiments of the present invention the tube may optionally be partly embedded in an upper substrate layer or a plastic scintillator layer. According to certain other embodiments of the present invention the tube that provides a fluid communication passageway may be wholly embedded in such a layer by, for example, pre-forming a throughhole through a substrate or scintillator material layer into which a tube may be inserted.

Figure 11:
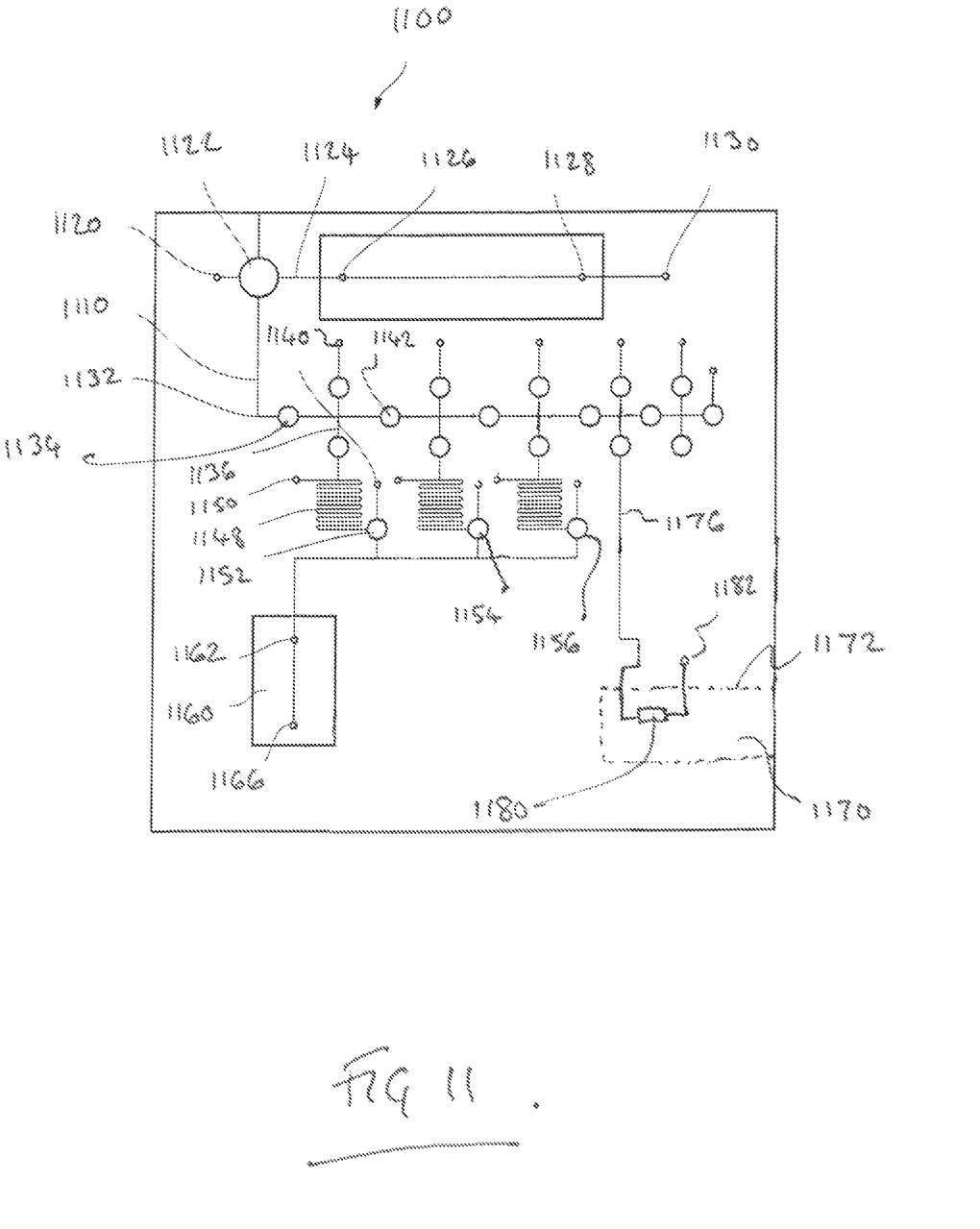
FIG. 11 illustrates a lab-on-chip device including a radiation detector.

FIG. 11 illustrates an alternative embodiment of a chip 1100. The micro fluidic 1100 of FIG. 11 is configured to be used to determine a plurality of sample characteristics. The micro fluidic chip 1100 has a number of detection zones at which one or more characteristic can be analysed. One of the detection zones can be used to detect radioactivity in a target fluid.

The micro fluidic chip includes a layered structure. The micro fluidic chip 1100 includes a first microchannel 1110 which is in fluid communication with an inlet port 1120. A sample fluid can be introduced into the micro fluidic chip through the inlet port 1120. The first microchannel 1100 includes multiple valve elements. A first valve element 1122 can control movement of a fluid e.g. the sample into the first microchannel. The chip illustrated in FIG. 11 comprises an additional microchannel 1124 which is referred to as a sample channel. The sample channel is in fluid communication with the sample inlet port. The sample channel intercepts the first microchannel. The first valve element may be a multi-directional valve which controls movement of the sample either to the sample channel or the first microchannel depending on a requirement of the user. The valve element can be physically rotated and a negative pressure applied to draw the sample in the sample channel into the first microchannel for subsequent direction to detection zones. Other valve elements and techniques for selectively determining a pathway for fluid can of course be utilised.

Figure 12:
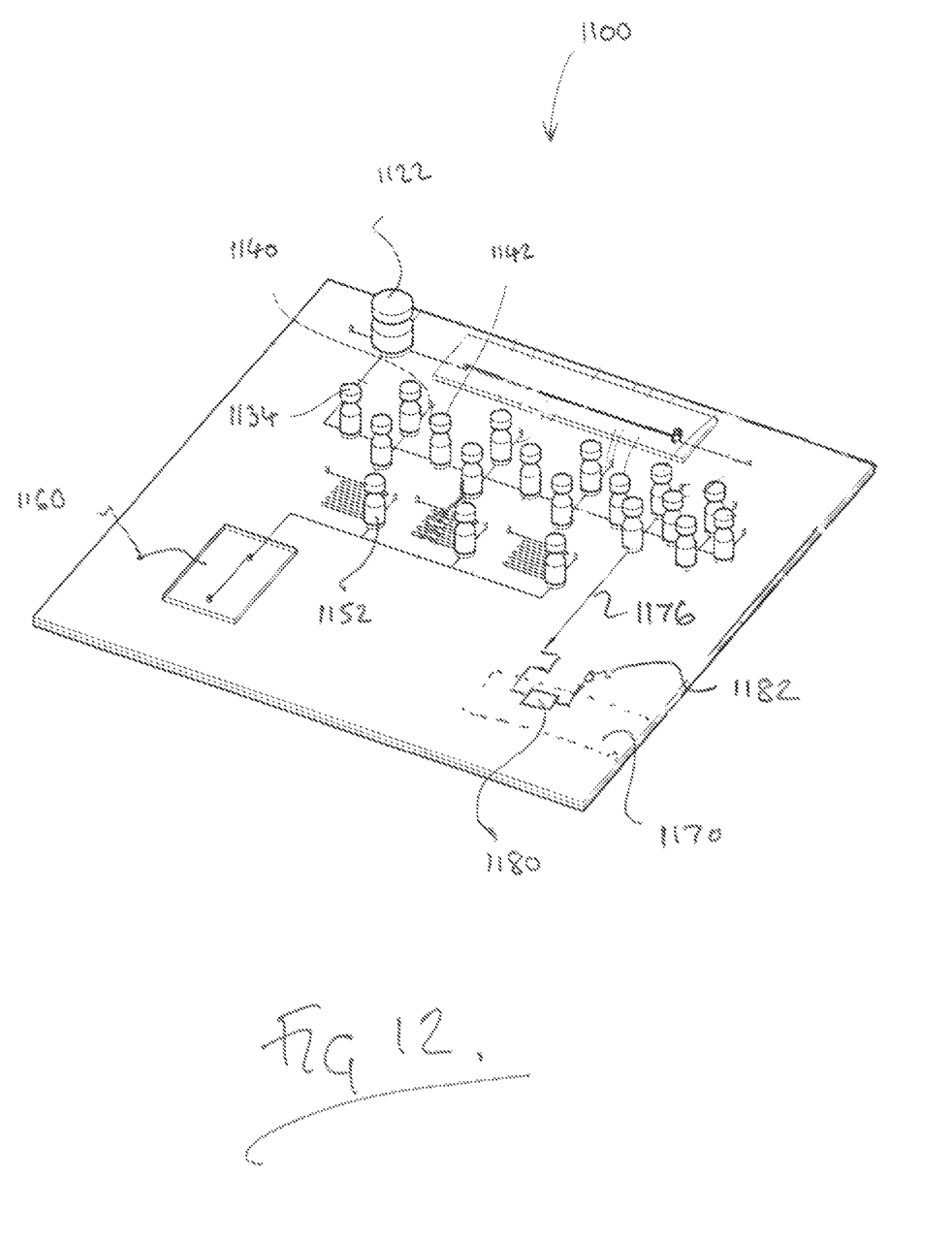
FIG. 12 illustrates another view of the lab-on-chip device shown in FIG. 11.

With reference to FIG. 11 and FIG. 12 the sample channel 1124 is in fluid communication with a sample outlet 1130 via a first detection channel 1126 and a second detection channel 1128. Aptly the sample channel is not connected to any further inlet. As such no reagents are added to the sample in the sample channel and the sample may be suitable for administration to a patient in need thereof. Whether the sample is administered is dependent on the outcome of the one or more tests carried out by the system illustrated according to certain embodiments and determination of certain sample characteristics.

The first detection channel and the second detection channel may be in fluid communication via a portion of the sample channel which is provided in the lower planar structure. Thus, in use, a sample or portion thereof is made to flow along the sample channel down the first detection channel along the sample channel in the lower planar structure and then upwardly along the second detection channel. The sample then exits via the outlet 1130.

Aptly the first microchannel 1110 comprises a plurality of valve elements which can be used to direct flow of the sample and/or reagents and/or solutions from the first microchannel to other areas of the micro fluidic chip. In addition the valve elements can be utilised to isolate portions of the fluid in the first microchannel from other areas of the first microchannel. Aptly the valve elements are provided in series. The number of valve elements depends upon how many tests are to be provided on the chip and thus how many detection zone portions of the sample are to be directed to.

The first microchannel 1110 includes an approximately 90° change in direction at a corner 1132 to a second valve element 1134. A first intersecting channel 1136 is provided on the chip. The first intersecting channel 1136 is in fluid communication with a further inlet, referred to herein as a second inlet port 1140. The first intersecting channel intersects the first microchannel at a junction between the second valve element 1134 and a third valve element 1142.

As described herein below each intersecting channel may be provided with a pair of valve elements which prevent flow of fluid from the detection zones during filling of the first microchannel with the sample and/or otherwise control a flow path. Aptly, one of the pair of valve elements is provided in the intersecting channel upstream of the junction between the intersecting channel and the microchannel and one of the pair is provided downstream of the junction. Once a flow of the sample or a portion thereof is desired to be provided to a detection zone as desired the valves of the intersecting channel can be opened to provide a fluid flow path to the detection zone. Aptly each valve is an open/close type valve having only two states or modes of operation.

FIG. 11 illustrates how the first intersecting channel 1136 is connectable to a serpentine mixing portion 1148. A portion of the sample located in the intersecting channel 1136 may be mixed with a reagent in the serpentine mixing portion 1148. The reagent may be introduced via a corresponding inlet 1150. Further serpentine portions and reagent inlets are illustrated in FIG. 11 by way of example. By controlling a state of a respective control valve 1152, 1154, 1156 the duly mixed mixture can be provided to a first detection zone 1160. The detection zone aptly includes a detection channel 1162 which extends at least partially through the thickness of the chip and provides a path length between a source and a detector associated with the detection zone 1160. The detection zone includes an outlet for removing fluid which has traveled along its detection channel in the detection zone 1160.

FIG. 11 illustrates a second detection zone 1170 indicated by a dotted line 1172. This detection zone 1170 is a region of the chip 1100 which can be utilised to detect radioactivity. A sample is input into the detection zone 1170 as a target fluid along an inlet 1176. This flows through a microchannel 1180 to an outlet 1182. The detection zone is formed as per any of the previously described embodiments in accordance with the present invention. By selectively opening and closing a respective valve the target fluid associated with a sample can be selectively provided and caused to flow along the microchannel 1180. The microchannel 1180 is formed in one or more of the layers of the substrate of the chip 1100. The layers include at least one region of scintillator material for providing light responsive to radioactivity in the target fluid in microchannel 1180. At least one silicon photomultiplier (SiPM) element is provided for providing an output signal responsive to the light provided by the scintillator material.

The embodiment illustrated in FIG. 11 for example may be used to test a sample for a number of differing characteristics. For example, certain embodiments of the present invention test the "appearance" and/or clarity of a sample comprising [$^{18}$F]FDG. In the BP, it is stated that the appearance of an [$^{18}$F]FDG should be a "clear, colourless or slightly yellow solution". However, it is generally considered that a slightly yellow solution is likely to contain impurities. Furthermore, other pharmacopoeias state that [$^{18}$F]FDG should be "colourless and free from particulate matter". Thus, it is often proposed that an [$^{18}$F]FDG solution should be clear, colourless, and free from particulate matter. Certain embodiments of the present invention determine the appearance of a compound for in vivo use e.g. a radiopharmaceutical and aptly determine if the compound is suitable for administration to a patient.

In addition, the sample of the compound e.g. a fluorine containing compound such as [$^{18}$F]FDG should be tested for the presence and amount of chemical impurities. In terms of chemical purity testing, CIDG refers to 2-chloro-2-deoxy-D-glucose, an impurity that can be present particularly when using acid hydrolysis in which a chloride atom takes the place of the [$^{18}$F]fluoride label. A further source of chloride may be an anion exchange cartridge used to pre-concentrate the [$^{18}$F]fluoride label in many systems, depending on the counter ion present on the cartridge resin.

Aptly, ACY-[$^{18}$F]FDG or alternatively ACY-FDG refers to the acetylated/unhydrolysed form of [$^{18}$F]FDG, which is 2-[$^{18}$F]fluoro-1,3,4,6-tetra-O-acetyl-D-glucose (also referred to as [$^{18}$F]TAG), while partially hydrolysed ACY-[$^{18}$F]FDG can also be present.

[$^{18}$F]FDM is 2-[$^{18}$F]fluoro-2-deoxy-D-mannose, a byproduct that can be produced during the [$^{18}$F]FDG synthesis process, and which can also be present in fully or partially hydrolysed form (ACY-[$^{18}$F]FDM).

pH

According to the BP, the pH of a dose of a compound for in vivo use, e.g. a [$^{18}$F]FDG dose should be in the range of 4.5 to 8.5, although this range can vary in other pharmacopoeias (e.g. pH 4.5 to 7.5 in the USP).

Kryptofix 2.2.2

The aminopolyether, Kryptofix 2.2.2 (4,7,13,16,21,24-hexaoxa-1,10-diazabicyclo[8.8.8] hexacosane), also known as cryptand 2.2.2, is a phase transfer catalyst used during [$^{18}$F]FDG synthesis. It incorporates a potassium ion into its cage-like structure, preventing the formation of potassium [$^{18}$F]fluoride in acetonitrile and thus leaving the [$^{18}$F]fluoride ion to react with the mannose triflate molecule by nucleophilic substitution. However, while an important aspect of the synthesis, Kryptofix 2.2.2, hereafter referred to as K222, is also very toxic, causing apnoea, ptosis and convulsions in patients, while the intravenous $LD_{50}$ in rats is 35 mg/kg. Thus, its removal from [$^{18}$F]FDG is important and its concentration in a dose must be determined.

The limit of K222 that can be present in [$^{18}$F]FDG depends varies between pharmacopoeias, with the EP and BP stating a limit of 2.2 mg per volume of dose (e.g. the maximum amount of K222 that could be in a 10 mL dose would be 2.2 mg, which would be equivalent to 220 µg $mL^{-1}$), while in the USP the limit is set at 50 µg $mL^{-1}$. K222 is essential for many radiolabelling processes involving [$^{18}$F]fluoride, and so is not limited to only [$^{18}$F]FDG.

While Kryptofix 2.2.2, referred to as "aminopolyether" in the BP, is usually the phase transfer catalyst of choice in the synthesis of [$^{18}$F]FDG by nucleophilic substitution, other catalysts such as tetrabutylammonium and 4-(4-methylpiperidin-1-yl)pyridine can also be employed instead, hence their inclusion in the BP. However, it is worth noting that the BP states that specific tests do not need to be performed if there is no source of the potential impurity (e.g. the test for tetrabutylammonium is not required if Kryptofix 2.2.2 is used as the phase transfer catalyst).

Bacterial Endotoxin

In the case of [$^{18}$F]FDG and other radiopharmaceuticals, the presence and/or quantity of bacterial endotoxin must be determined prior to the radiopharmaceutical being deemed safe for administration to a patient. Bacterial endotoxins can be introduced into the radiopharmaceutical manufacturing process by way of for example non sterile tubing, containers, chemicals and/or water.

The tests (for FDG for example) that the plastic scintillator/SiPM would be suitable for include:
1. Determination of the level of radioactivity (which may be performed on the final, useable dose);
2. Determination of half-life: this is to ensure that the radioactivity is due to the desired radionuclide (e.g. the half-life of fluorine-18 is 109.7 min and so when measuring the half-life of FDG the value should be between 105 min and 115 min);
3. If possible, the determination of the energy spectra to ensure that the detected activity is due to the 511 keV gamma photons (or a combined total of 1.022 MeV);
4. For detection of the relative amounts of [$^{18}$F]FDG, 2-[$^{18}$F]fluoro-2-doexy-D-mannose ([$^{18}$F]FDM) following their separation by strong anion exchange chromatography;
5. For detection of the relative amounts of [$^{18}$F]fluoride, ACY-[$^{18}$F]FDG, and [$^{18}$F]FDG following their separation via normal phase or reversed phase chromatography;
6. Radiochemical identity of [$^{18}$F]FDG against a standard FDG solution based on its retention time on a strong anion exchange chromatography column.

Each of the above mentioned characteristics and tests can be determined using chips incorporating certain embodiments of the present invention. Once the characteristics of the sample have been determined, a decision can be made as to whether or not the compound is suitable for in vivo use. In certain embodiments of the present invention, the sample has a volume which is only a small percentage greater than a single unit dose of the compound. Thus, a single unit dose of the sample comprising the compound exits the chip and is suitable for administration to a patient, providing all of the sample's characteristics meet the stated requirements for in vivo use.

Certain embodiments of the present invention have been described in which milled channels can be formed in a plastic scintillator layer via CNC milling. The milled piece is then bonded to either a conventional plastic top plate (e.g. PMMA) or to a second piece of plastic scintillator via double sided tape or other bonding technique. Aptly as an alternative injection moulding can be utilised or plastic scintillator having a desired inset region can be provided by direct polymerisation of the plastic scintillator in a mould. As a still further alternative hot embossing can alternatively be utilised to provide a required microchannel design in a sheet of plastic scintillator. It will be appreciated that according to certain embodiments of the present invention hot embossing can be utilised for bonding adjacent layers. Other methods of bonding could include the use of various types of glues, ultrasonic welding, solvent-based bonding or the like.

Certain embodiments of the present invention provide a method and apparatus suitable for quality control (QC). Miniaturised HPLC separations of radiotracer impurities in a microfluidic device can be performed with detection via a microfluidic chip. Certain embodiments of the present invention can also be applied to radio-TLC detection. Aptly in such a case an array of SiPMs is used to cover a large area. Such a technique may optionally also be employed to measure radioactivity levels and for determination of half-life for radionuclidic identity and purity.

Certain other embodiments of the present invention can be utilised for non-QC applications. For example certain embodiments of the present invention can be used to monitor chemical synthesis and/or detection of radiotracers in blood that is being continuously drawn from a patient following injection of the radiotracer and during a PET scan.

Certain embodiments of the present invention have been described in which the plastic scintillator itself features the microfluidic channel. It will be appreciated that the channel might also be moulded in the plastic scintillator via injection moulding or by polymerisation of the plastic within a mould. The channel designs may optionally be hot embossed or laser cut into the plastic scintillator.

It will likewise be appreciated that certain embodiments of the present invention can be utilised more broadly wherever a target fluid may contain radioactive matter. This can occur when a desired radioactive material is introduced but may likewise, as an alternative, be utilised when a target fluid should be free of radioactivity and as such can be utilised as a threat indicator. For example such use can be made of a detector in an environment where a radioactive leak may occur. The radiation detection would thus be a sign of an undesired breach of security measures/shielding.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An apparatus for detecting radioactivity in a target fluid, comprising:
   at least one fluid communication passageway for a target fluid;

at least one region of scintillator material for providing light responsive to radioactivity in the target fluid; and at least one solid state light sensor element for providing an output signal responsive to the light;

wherein the at least one fluid communication passageway comprises a microchannel in a surface of the at least one region of scintillator material.

2. The apparatus of claim 1, wherein the microchannel comprises two face-to-face sub-microchannels provided in opposed surfaces of juxtaposed regions of the at least one region of scintillator material.

3. The apparatus of claim 1, wherein the at least one fluid communication passageway comprises a lumen comprising at least one tube member at a first surface of the at least one region of scintillator material.

4. The apparatus of claim 1, wherein the at least one region of scintillator material comprises at least one layer of plastic scintillator material.

5. The apparatus of claim 4, wherein each of the at least one layer of plastic scintillator material has a thickness selected from 0.05 to 2.05 mm.

6. The apparatus of claim 1, wherein the at least one solid state light sensor element comprises a silicon photomultiplier (SiPM) element.

7. The apparatus of claim 6, wherein said SiPM element comprises an array of SiPM sensors.

8. The apparatus of claim 1, wherein:

(i) the microchannel has a width of 100 μm to 200 μm and a depth of 10 μm to 100 μm;

(ii) the radioactivity comprises positrons; and/or (iii) the at least one region of scintillator material comprises a polymer material doped with scintillating material, a polymer material that exhibits scintillating properties, or both.

9. The apparatus of claim 1 wherein:

the at least one fluid communication passageway comprises an inlet and an outlet and follows a linear pathway or a serpentine pathway.

* * * * *